(12) United States Patent
Lee et al.

(10) Patent No.: US 11,784,761 B2
(45) Date of Patent: Oct. 10, 2023

(54) METHOD AND DEVICE FOR HARQ-BASED TRANSMISSION/RECEPTION FOR GROUP-COMMON TRANSMISSION IN WIRELESS COMMUNICATION SYSTEM

(71) Applicant: LG ELECTRONICS INC., Seoul (KR)

(72) Inventors: Youngdae Lee, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/101,481

(22) Filed: Jan. 25, 2023

(65) Prior Publication Data

US 2023/0163895 A1     May 25, 2023

Related U.S. Application Data

(63) Continuation of application No. PCT/KR2022/006735, filed on May 11, 2022.

(30) Foreign Application Priority Data

May 11, 2021    (KR) .................. 10-2021-0060559

(51) Int. Cl.
    *H04L 1/1829*     (2023.01)
    *H04L 1/1812*     (2023.01)
(52) U.S. Cl.
    CPC .......... *H04L 1/1854* (2013.01); *H04L 1/1812* (2013.01)
(58) Field of Classification Search
    CPC ................. H04L 1/1854; H04L 1/1812
(Continued)

(56) References Cited

U.S. PATENT DOCUMENTS

2013/0039297 A1*   2/2013   Wang ............... H04W 76/25
                                                                                          370/328
2020/0137803 A1    4/2020   Fakoorian et al.
(Continued)

OTHER PUBLICATIONS

CATT, "Discussion on group scheduling mechanism for RRC_Connected UEs in MBS", R1-2102609, Apr. 12 20, 2021. (From Applicant's IDS) (Year: 2021).*
(Continued)

*Primary Examiner* — Mang Hang Yeung
(74) *Attorney, Agent, or Firm* — BRYAN CAVE LEIGHTON PAISNER LLP

(57) ABSTRACT

A method performed by a terminal in a wireless communication system according to an embodiment of the present disclosure comprises the steps of: receiving a group-common transmission regarding a TB from a network; transmitting hybrid automatic repeat request (HARQ) acknowledgement (ACK) or non-acknowledgement (NACK) information regarding the group-common transmission to the network, on the basis of whether the TB is successfully decoded; and receiving first transmission from the network after a first round trip time (RTT) has lapsed since transmission of the HARQ ACK/NACK information regarding the group-common transmission. The first transmission corresponds to group-common transmission or terminal-specific transmission. The first transmission may correspond to retransmission of the TB on the basis that the first transmission is terminal-specific transmission associated with the same HARQ process as the group-common transmission, and that a new data indicator (NDI) value is not toggled.

7 Claims, 11 Drawing Sheets

(58) Field of Classification Search
USPC .......................................................... 370/312
See application file for complete search history.

(56) References Cited

U.S. PATENT DOCUMENTS

| 2021/0068004 | A1* | 3/2021 | Kadiri | H04W 28/0268 |
| 2022/0124840 | A1* | 4/2022 | Li | H04W 76/10 |
| 2022/0286818 | A1* | 9/2022 | Chin | H04W 24/08 |
| 2022/0321280 | A1* | 10/2022 | Wei | H04L 1/1822 |

OTHER PUBLICATIONS

Vivo, "Group Scheduling for MBS", R2-2103121, Apr. 12-Apr. 20, 2021. (From Applicant's IDS) (Year: 2021).*

Intel Corporation, "MBS MAC Layer and Group Scheduling Aspects", R2-2102839, 3GPP TSG-RAN WG2 Meeting #113bis-e, Electronic meeting, Apr. 2, 2021, see sections 1, 2.1 and 2.4.

Moderator (CMCC), "Summary#8 on mechanisms to support group scheduling for RRC_Connected UEs for NR MBS", R1-2104044, 3GPP TSG RAN WG1 #104b-e, e-Meeting, Apr. 21, 2021, see pp. 78-79.

Vivo, "Group Scheduling for MBS", R2-2103121, 3GPP TSG-RAN WG2 Meeting #113bis electronic, E-Meeting, Apr. 2, 2021, see section 2.3.

CATT, "Discussion on group scheduling mechanism for RRC_Connected UEs in MBS", R1-2102609, 3GPP TSG RAN WG1 Meeting #104b-e, e-Meeting, Apr. 7, 2021, see section 2.3.2.

* cited by examiner

METHOD AND DEVICE FOR HARQ-BASED TRANSMISSION/RECEPTION FOR GROUP-COMMON TRANSMISSION IN WIRELESS COMMUNICATION SYSTEM

CROSS-REFERENCE TO RELATED APPLICATIONS

This application is a Continuation Application of International Application No. PCT/KR2022/006735, filed on May 11, 2022, which claims the benefit of earlier filing date and right of priority to Korean Application No. 10-2021-0060559, filed on May 11, 2021, the contents of which are all hereby incorporated by reference herein in their entirety.

TECHNICAL FIELD

The present disclosure relates to a wireless communication system, and in more detail, relates to a method and a device for hybrid automatic repeat request (HARQ)-based transmission and reception for group common transmission in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical problem of the present disclosure is to provide a method and a device for HARQ-based transmission and reception for group common transmission in a wireless communication system.

An additional technical problem of the present disclosure is to provide a method and a device for efficiently performing initial transmission and retransmission while minimizing terminal power consumption in HARQ-based transmission and reception for group common transmission in a wireless communication system.

The technical objects to be achieved by the present disclosure are not limited to the above-described technical objects, and other technical objects which are not described herein will be clearly understood by those skilled in the pertinent art from the following description.

A method of receiving group common data by a terminal in a wireless communication system according to an aspect of the present disclosure includes receiving from a network group common transmission for a transport block (TB); based on whether the TB is successfully decoded, transmitting to the network hybrid automatic repeat request (HARQ) acknowledgement (ACK) or non-acknowledgement (NACK) information for the group common transmission; and receiving first transmission from the network after a first round trip time (RTT) elapses after transmission of HARQ ACK/NACK information for the group common transmission, and the first transmission corresponds to group common transmission or terminal-specific transmission, and on a basis that the first transmission is terminal-specific transmission associated with the same HARQ process as the group common transmission and that a new data indicator (NDI) value is not toggled, the first transmission may correspond to retransmission of the TB.

In a method of transmitting group common data by a base station in a wireless communication system according to an additional aspect of the present disclosure, the method includes transmitting to at least one terminal group common transmission for a transport block (TB); based on whether the TB is successfully decoded, receiving from a terminal hybrid automatic repeat request (HARQ) acknowledgement (ACK) or non-acknowledgement (NACK) information for the group common transmission; and transmitting first transmission to the terminal after a first round trip time (RTT) elapses after reception of HARQ ACK/NACK information for the group common transmission, and the first transmission corresponds to group common transmission or terminal-specific transmission, and on a basis that the first transmission is terminal-specific transmission associated with the same HARQ process as the group common transmission and that a new data indicator (NDI) value is not toggled, the first transmission may correspond to retransmission of the TB.

According to an embodiment of the present disclosure, a method and a device for HARQ-based transmission and reception for group common transmission in a wireless communication system may be provided.

According to an embodiment of the present disclosure, a method and a device for efficiently performing initial transmission and retransmission while minimizing terminal power consumption in HARQ-based transmission and reception for group common transmission in a wireless communication system may be provided.

Effects achievable by the present disclosure are not limited to the above-described effects, and other effects which are not described herein may be clearly understood by those skilled in the pertinent art from the following description.

BRIEF DESCRIPTION OF DRAWINGS

Accompanying drawings included as part of detailed description for understanding the present disclosure provide embodiments of the present disclosure and describe technical features of the present disclosure with detailed description.

DETAILED DESCRIPTION

Figure 1:
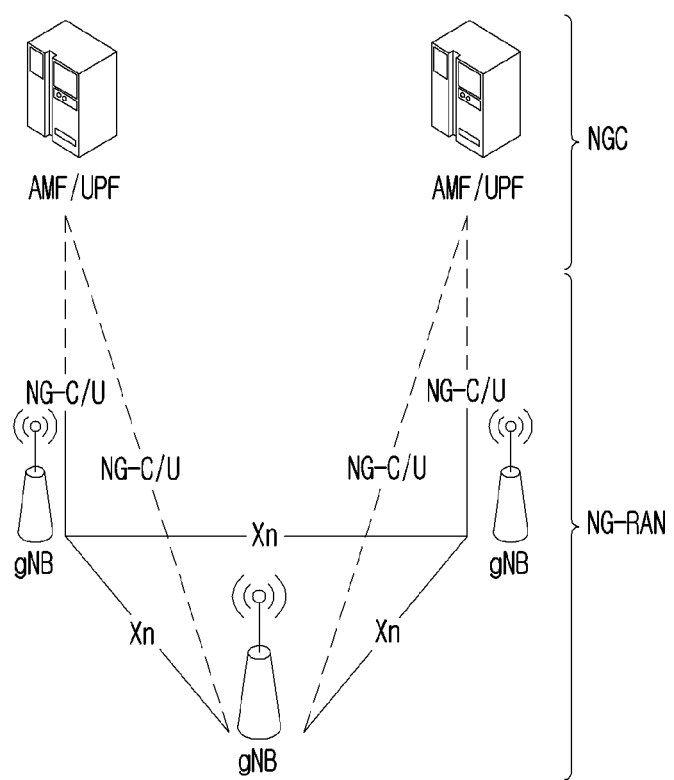
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11(Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification)

36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211(physical channels and modulation), TS 36.212(multiplexing and channel coding), TS 36.213(physical layer procedures), TS 36.300(overall description), TS 36.331(radio resource control) may be referred to.

For 3GPP NR, TS 38.211(physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power
Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
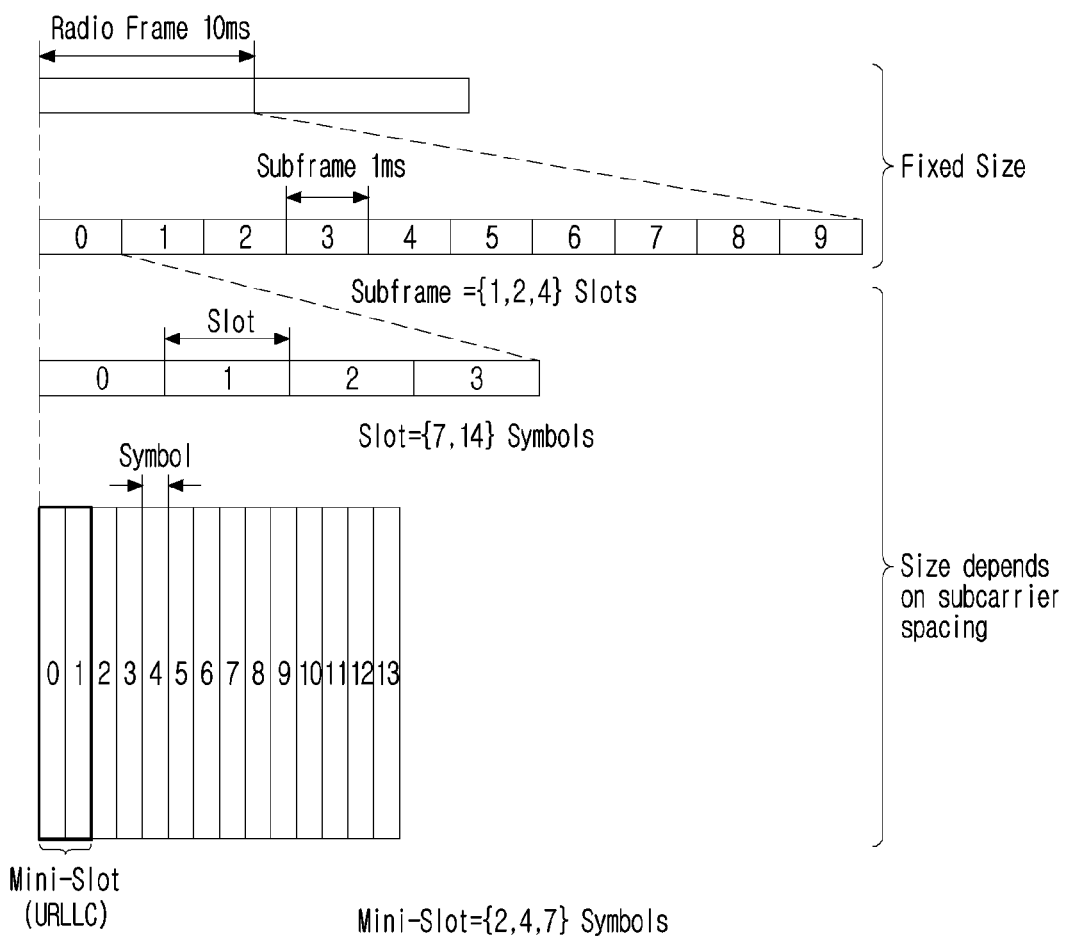
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
|---|---|---|
| 0 | 15 | Normal |
| 1 | 30 | Normal |

TABLE 1-continued

| μ | Δf = $2^\mu \cdot 15$ [kHz] | CP |
|---|---|---|
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max}N_f/100) \cdot T_c=10$ ms. Here, a radio frame is configured with 10 subframes having a duration of $T_{sf}=(\Delta f_{max}N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^\mu \in \{0, \ldots, N_{slot}^{subframe,\mu}-1\}$ in a subframe and are numbered in an increasing order of $n_{s,f}\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s\mu$ in a subframe is temporally arranged with a start of an OFDM symbol $n_s\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
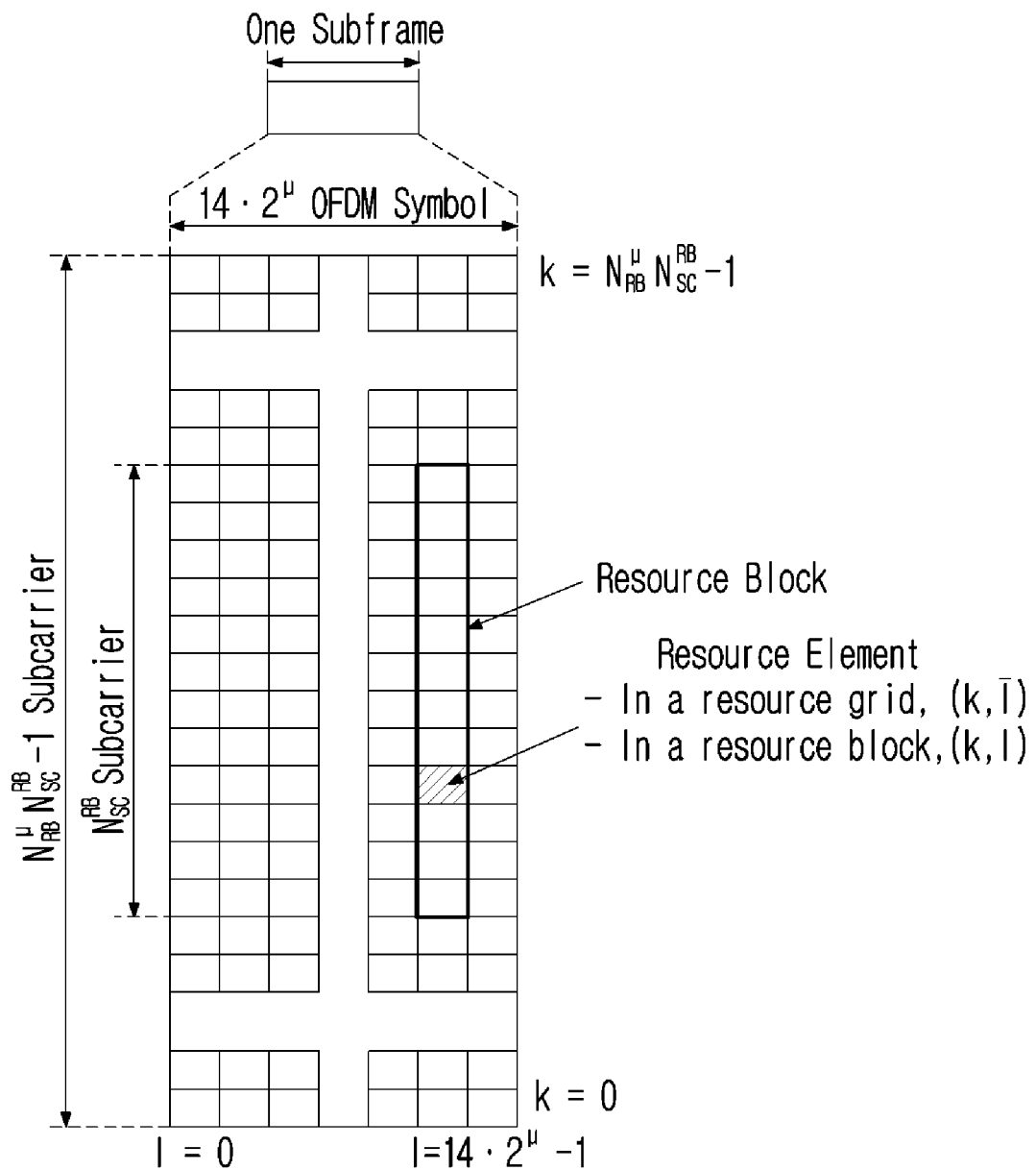
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}\mu N_{sc}^{RB}$ subcarriers in a frequency domain and one subframe is configured with $14 \cdot 2\mu$ OFDM symbols, but it is not limited thereto. In an NR system, a transmitted signal is described by OFDM symbols of $2\mu N_{symb}(\mu)$ and one or more resource grids configured with $N_{RB}\mu N_{sc}RB$ subcarriers. Here, $N_{RB}\mu \leq N_{RB}max,\mu$. The $N_{RB}max,\mu$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, ..., $N_{RB}\mu N_{sc}RB-1$ is an index in a frequency domain and 1'=0, ..., $2\mu N_{symb}(\mu)-1$ refers to a position of a symbol in a subframe. When referring to a resource element in a slot, an index pair (k,l) is used. Here, 1=0, ..., $N_{symb}\mu-1$. A resource element (k,l') for μ and an antenna port p corresponds to a complex value, $a_{k,l}'$ (p,μ). When there is no risk of confusion or when a specific antenna port or numerology is not specified, indexes p and μ may be dropped, whereupon a complex value may be $a_{k,l}'$ (p) or $a_{k,l}'$. In addition, a resource block (RB) is defined as $N_{sc}RB=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}\mu$ and a resource element (k,1) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}$size,μ−1 in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}$start,μ is a common resource block that a BWP starts relatively to common resource block 0.

Figure 4:
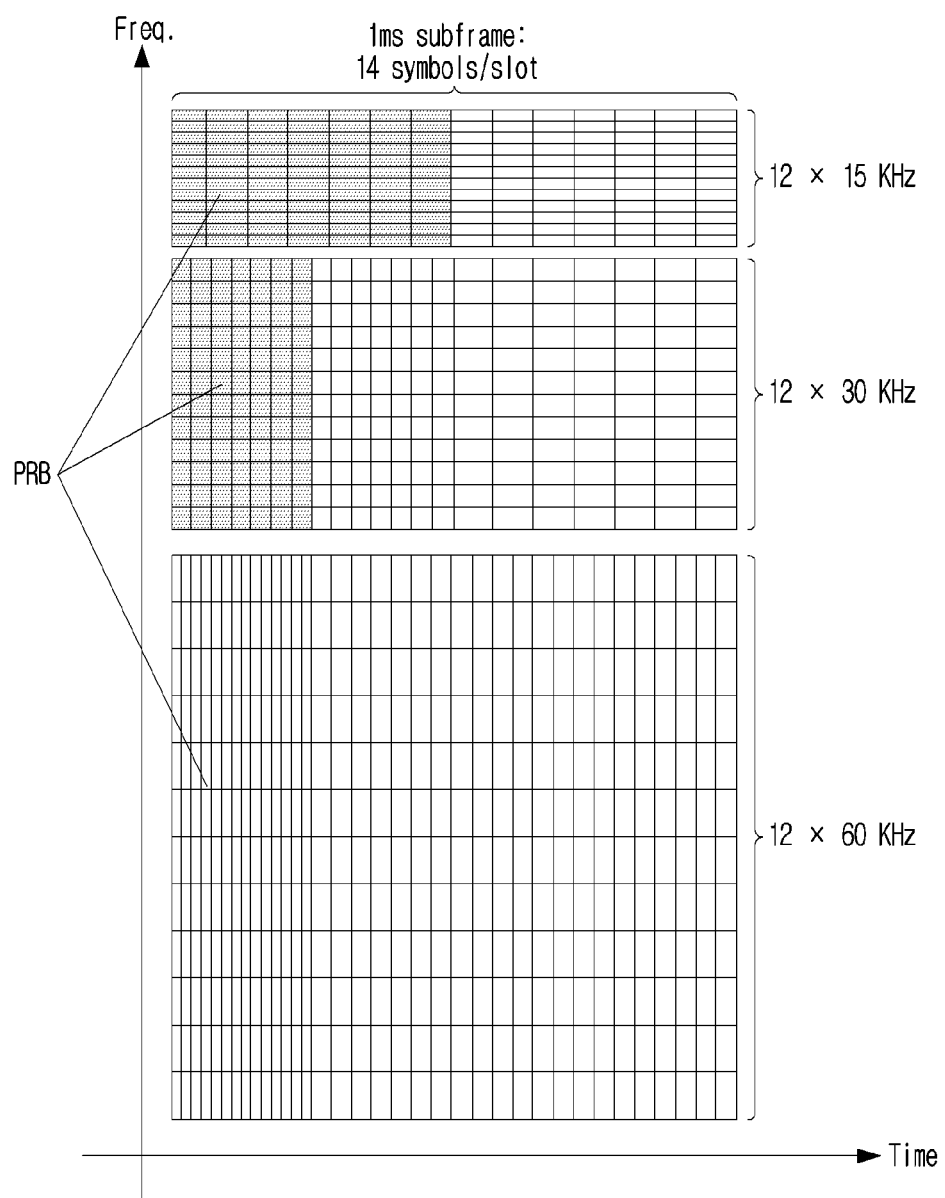
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
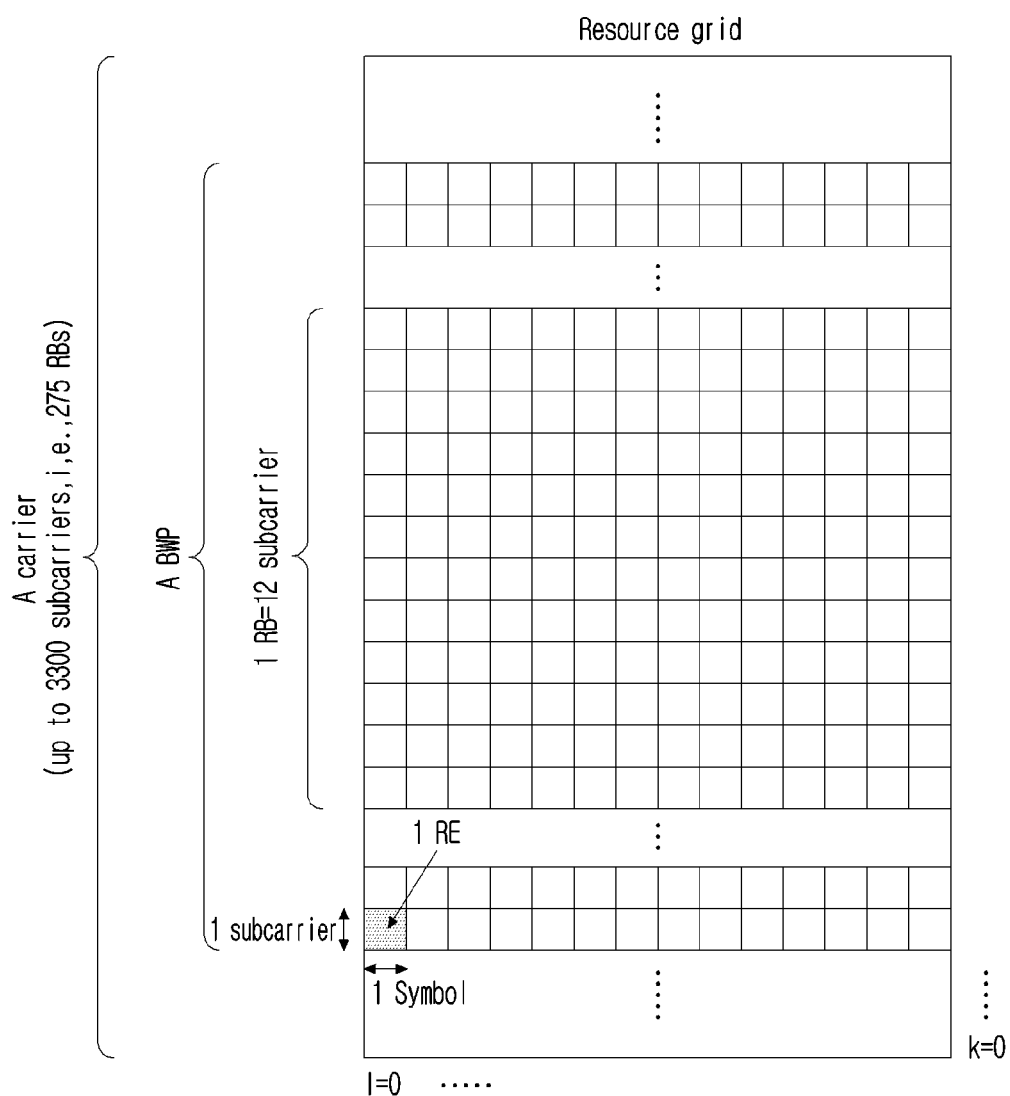
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP (s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
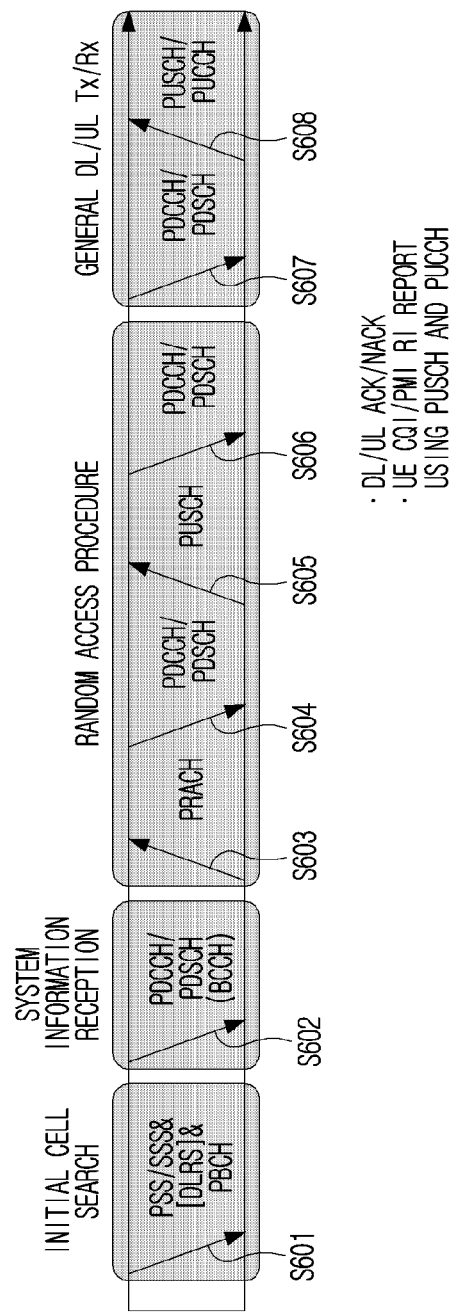
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/

PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid—Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

DRX (Discontinuous Reception (Rx))

A terminal may perform a DRX operation while performing an operation according to examples of the present disclosure. A terminal that DRX is configured may lower power consumption by discontinuously receiving a DL signal. DRX may be performed in a RRC (Radio Resource Control)_IDLE state, a RRC_INACTIVE state and a RRC_CONNECTED state. In a RRC_IDLE state and a RRC_INACTIVE state, DRX is used to discontinuously receive a paging signal. Hereinafter, DRX performed in a RRC_CONNECTED state is described (RRC_CONNECTED DRX).

Figure 7:
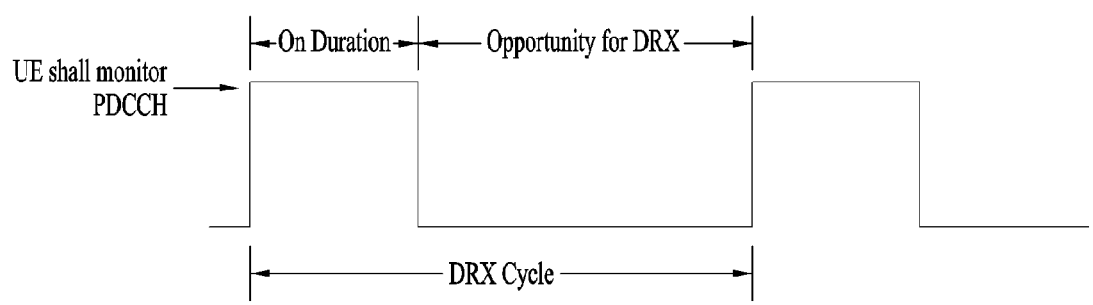
FIG. 7 is a diagram for describing a DRX cycle in a RRC_CONNECTED state to which the present disclosure may be applied.

FIG. 7 is a diagram for describing a DRX cycle in a RRC_CONNECTED state to which the present disclosure may be applied.

In reference to FIG. 7, a DRX cycle is configured with on-duration and an opportunity for DRX. A DRX cycle defines a time interval that On Duration is periodically repeated. On Duration represents a time interval that a terminal performs monitoring to receive a PDCCH. If DRX is configured, a terminal performs PDCCH monitoring during On Duration. When there is a PDCCH which is successfully detected during PDCCH monitoring, a terminal operates an inactivity timer and maintains an awake state. When there is no PDCCH which is successfully detected during PDCCH monitoring, a terminal is into a sleep state after On Duration.

When DRX is configured, PDCCH monitoring/reception may be discontinuously performed in a time domain in performing an operation according to examples of the present disclosure. For example, when DRX is configured, a PDCCH reception occasion (e.g., a slot having a PDCCH search space) may be discontinuously configured according to a DRX configuration.

When DRX is not configured, PDCCH monitoring/reception may be continuously performed in a time domain. For example, when DRX is not configured, a PDCCH reception occasion (e.g., a slot having a PDCCH search space) may be continuously configured. Meanwhile, regardless of whether DRX is configured, PDCCH monitoring may be limited in a time interval configured by a measurement gap.

A DRX (or C-DRX) operation for a terminal in a RRC_CONNECTED state may be represented in 3 steps. A first step may include receiving DRX configuration information through RRC signaling (e.g., MAC-CellGroupConfig IE). A second step may include receiving a DRX command through a MAC CE (e.g., a DRX command MAC CE or a Long DRX command MAC CE). A third step may include performing PDCCH monitoring by a terminal during on-duration of a DRX cycle. In other words, DRX configuration information is received through higher layer (e.g., RRC) signaling and whether of DRX ON/OFF is controlled by a DRX command of a MAC layer. When DRX is configured, a terminal, as illustrated in FIG. 7, may discontinuously perform PDCCH monitoring in performing an operation according to examples of the present disclosure.

Here, MAC-CellGroupConfig includes configuration information needed to configure a MAC parameter for a cell group. MAC-CellGroupConfig may also include configuration information on DRX. For example, MAC-CellGroup-Config may include at least one of the following parameters or a value for a non-illustrated additional parameter to define DRX.

drx-OnDurationTimer: A length of an interval when a terminal is awake for PDCCH monitoring at the start of a DRX cycle drx-InactivityTimer: A length of a time interval when a terminal is awake after a PDCCH occasion that a PDCCH indicating initial UL or DL data is detected drx-HARQ-RTT-TimerDL: A length of the maximum time interval until a PDCCH for DL retransmission may be received after a HARQ NACK feedback for DL initial transmission is transmitted (during this timer operation, UE sleeps/is deactivated)

drx-HARQ-RTT-TimerUL: A length of the maximum time interval until a PDCCH for UL retransmission may be received after UL initial transmission is performed (during this timer operation, UE sleeps/is deactivated)

MBMS (Multimedia Broadcast Multicast Service)

MBMS may include a single frequency network (SFN) scheme in which a plurality of base stations or a plurality of cells are synchronized to transmit the same data to a terminal, and a single cell point to multipoint (SC-PTM) scheme for broadcasting within the corresponding cell coverage through the PDCCH/PDSCH channel.

SFN scheme may be used to provide a broadcast service to a wide area (e.g., MBMS area) through resources allocated semi-statically in advance. A multicast broadcast single frequency network (MBSFN) provides logical channels, a multicast control channel (MCCH) and a multicast traffic channel (MTCH), and both of the MCCH and the MTCH are mapped to a transport channel, a multicast channel (MCH), and the MCH is mapped to a physical channel, a physical multicast channel (PMCH). That is, a plurality of base stations/cells may be synchronized to provide the same data to a terminal through the PMCH. One base station/cell may belong to a plurality of MBSFN areas. In addition, it may be required to configure the MBSFN subframe for the MBSFN service.

SC-PTM scheme may be mainly used to provide a broadcast service only within a cell coverage through dynamic resources. SC-PTM provides one logical channel, SC-MCCH (Single Cell Multicast Control Channel) and one or more logical channels SC-MTCH (Single Cell Multicast Traffic Channel). These logical channels (i.e., SC-MCCH and SC-MTCH) are mapped to the transport channel, DL-SCH, and the transport channel DL-SCH is mapped to the physical channel PDSCH. A PDSCH transmitting data corresponding to the SC-MCCH or SC-MTCH is scheduled through a PDCCH that is CRC scrambled with a group-radio network temporary identifier (G-RNTI). Here, a temporary mobile group identity (TMGI) corresponding to the MBMS service ID may be mapped one-to-one with a specific G-RNTI value. Accordingly, if the base station provides a plurality of MBMS services, a plurality of G-RNTI values may be allocated for SC-PTM transmission. One or more terminals may perform PDCCH monitoring using a specific G-RNTI to receive a specific MBMS service. Here, a discontinuous reception (DRX) on-duration period dedicated to SC-PTM may be configured for a specific MBMS service/specific G-RNTI. In this case, the corresponding terminals may wake up only for a specific on-duration period and perform PDCCH monitoring for the G-RNTI.

SPS (Semi-Persistent Scheduling)

The base station may provide a specific terminal with SPS configuration dedicated to the terminal, and allocate one or more downlink SPS transmission resources that are repeated according to a configured period. DCI of terminal-dedicated (or terminal-specific) PDCCH may indicate activation (SPS activation) of a specific SPS configuration index. The terminal may perform downlink reception through the activated SPS transmission resource. Such SPS transmission resource may be used for initial HARQ transmission. The base station may allocate a retransmission resource of a specific SPS configuration index through DCI of PDCCH dedicated to a terminal. For example, when the terminal reports HARQ NACK for the SPS transmission resource, the base station may allocate the retransmission resource through DCI so that the terminal may receive downlink retransmission.

DCI of PDCCH dedicated to a terminal may indicate release or deactivation of a specific SPS configuration index. In this case, the corresponding terminal does not receive the SPS transmission resource for which release/deactivation is indicated.

CRC of DCI/PDCCH for activation/retransmission/deactivation for SPS configuration/resource may be scrambled by configured scheduling-radio network temporary identifier (CS-RNTI).

MBS (Multicast Broadcast Service)

In the NR-based wireless communication system, introduction of a new MBS-based DL broadcast or DL multicast transmission scheme, which is distinct from the aforementioned MBMS (e.g., MBSFN or SC-PTM), is being discussed. For example, the network side (e.g., base station/cell/TRP) may provide a point-to-multipoint (PTM) transmission scheme and a point-to-point (PTP) transmission scheme for DL broadcast or DL multicast transmission.

In the PTM transmission scheme for MBS, the base station may transmit a group common (or group-specific) PDCCH and a group common PDSCH to a plurality of terminals. A plurality of terminals may simultaneously receive the same group common PDCCH transmission and group common PDSCH transmission, and decode the same MBS data.

In the PTP transmission scheme for MBS, the base station may transmit a terminal-dedicated (or terminal-specific) PDCCH and a terminal-dedicated PDSCH to a specific terminal. The corresponding single terminal may receive the terminal-dedicated PDCCH and a terminal-dedicated PDSCH. When there are a plurality of terminals receiving the same MBS service, the base station may individually transmit the same MBS data to each of the plurality of terminals through different terminal-dedicated PDCCHs and terminal-dedicated PDSCHs.

For group common PDSCH transmission, terminals belonging to the same group may (successfully) receive a TB in different PDSCH transmission/retransmission. A base station may transmit a new TB to a terminal which successfully receives a corresponding TB at an early time (e.g., before other terminal). Here, a new TB may correspond to another group common PDSCH transmission or may correspond to terminal-dedicated PDSCH transmission.

When different terminals receive the same TB through different PTP retransmission, any terminal may successfully receive a corresponding TB at an earlier time than other terminal. In this case, a new TB may be transmitted to a corresponding terminal.

If a previous TB and a new TB are transmitted through the same HARQ process (i.e., a HARQ process having the same HARQ process number (HPN)), a terminal may have to select one of a previous TB and a new TB. For example, when a terminal did not successfully receive/decode a previous TB, but a base station misunderstands a terminal successfully received a previous TB, a problem may occur that a terminal should select one of a previous TB and a new TB.

In this regard, in examples of the present disclosure, for a terminal performing different TB reception transmitted through the same HPN, whether to continuously receive a previous TB or whether to switch into new TB reception may be determined according to a specific standard. When switching to receiving a new TB, if a previous TB was not successfully received, a terminal may flush a soft buffer which stored a previous TB.

In addition, when PTP retransmission is performed for group common transmission, which timing is based by a terminal to expect PTP retransmission of a base station is not clear, so when a terminal continuously expects/monitors downlink reception, a problem for waste of electricity may occur.

In this regard, in examples of the present disclosure, for a terminal which does not successfully decode group common PDSCH transmission and transmits HARQ NACK, power consumption may be reduced without expecting retransmission during a predetermined time (i.e., without performing downlink monitoring/reception during a predetermined time).

Hereinafter, examples of receiving HARQ initial transmission and retransmission for group common transmission according to the present disclosure are described.

Figure 8:
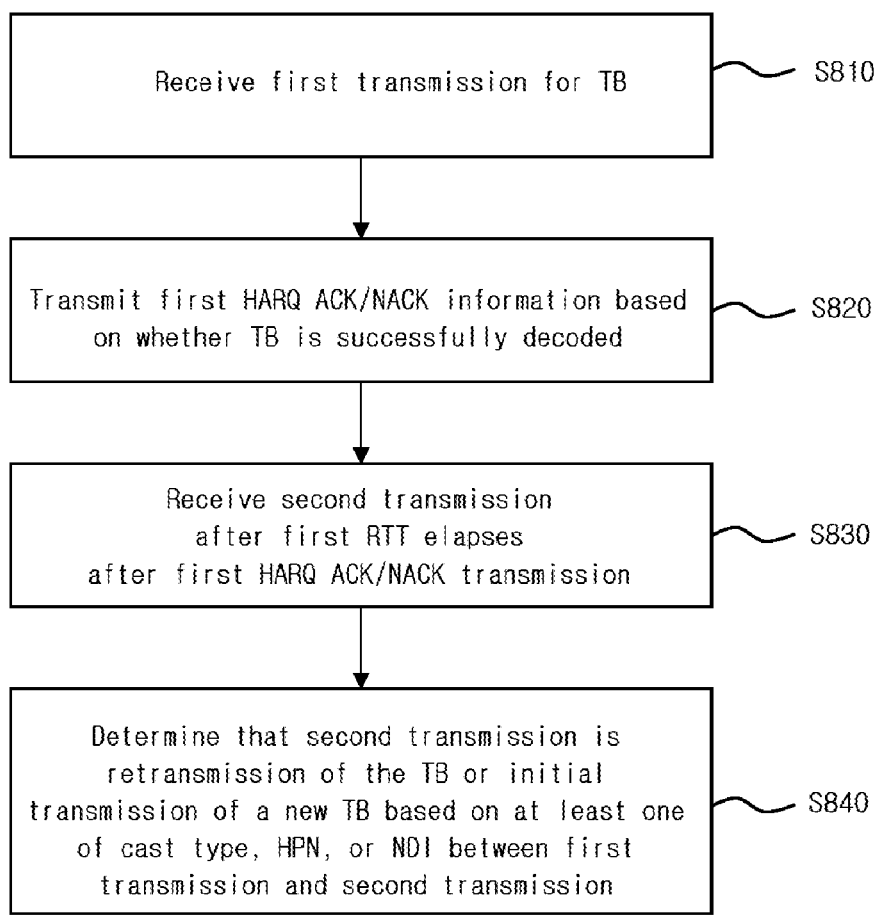
FIG. 8 is a diagram for describing a HARQ-based transmission and reception operation of a terminal for group common transmission according to an example of the present disclosure.

FIG. 8 is a diagram for describing a HARQ-based transmission and reception operation of a terminal for group common transmission according to an example of the present disclosure.

In the following examples, when a terminal receives group common transmission, it may include monitoring a PDCCH for detection of a DCI format which is CRC-scrambled by a group common identifier (e.g., a G-RNTI) and receiving a PDSCH scheduled by downlink assignment included in a corresponding DCI format. Group common transmission may include multicast or broadcast of group common data (or a TB). In the following examples, when a terminal receives terminal-specific transmission, it may include monitoring a PDCCH for detection of a DCI format which is CRC-scrambled by a terminal-specific identifier (e.g., a C-RNTI) and receiving a PDSCH scheduled by downlink assignment included in a corresponding DCI format. Terminal-specific transmission may include unicast of group common data (or a TB) or unicast of terminal-specific data (or a TB).

In S810, a terminal may receive first transmission for a transport block (TB) from a network (or a base station).

First transmission may be group common transmission or terminal-specific transmission.

In S820, a terminal may transmit first HARQ ACK/NACK information to a network based on whether a TB received in S810 is successfully decoded.

When TB decoding succeeds, HARQ ACK information may be transmitted and when TB decoding does not succeed (i.e., fails), HARQ NACK information may be transmitted.

In S830, a terminal may receive second transmission after a first round trip time (RTT) elapses after first HARQ ACK/NACK information transmission.

Second transmission may not be expected by a terminal during a first RTT after first HARQ ACK/NACK information transmission.

Second transmission may be group common transmission or terminal-specific transmission.

In S840, a terminal may determine whether the second transmission corresponds to retransmission of a TB received in S810 or is initial transmission of a new TB based on at least one of a cast type, a HARQ process number (HPN), or a new data indicator (NDI) of first transmission and second transmission.

Additionally, third transmission may be received by a terminal after a second RTT elapses after second HARQ ACK/NACK transmission for second transmission. Here, a terminal may not expect third transmission during a second RTT after second HARQ ACK/NACK transmission. Third transmission may be group common transmission or terminal-specific transmission.

A terminal may determine whether the third transmission corresponds to retransmission of a TB of second transmission or is initial transmission of a new TB based on at least one of a cast type, a HPN, or a NDI of second transmission and third transmission.

Figure 9:
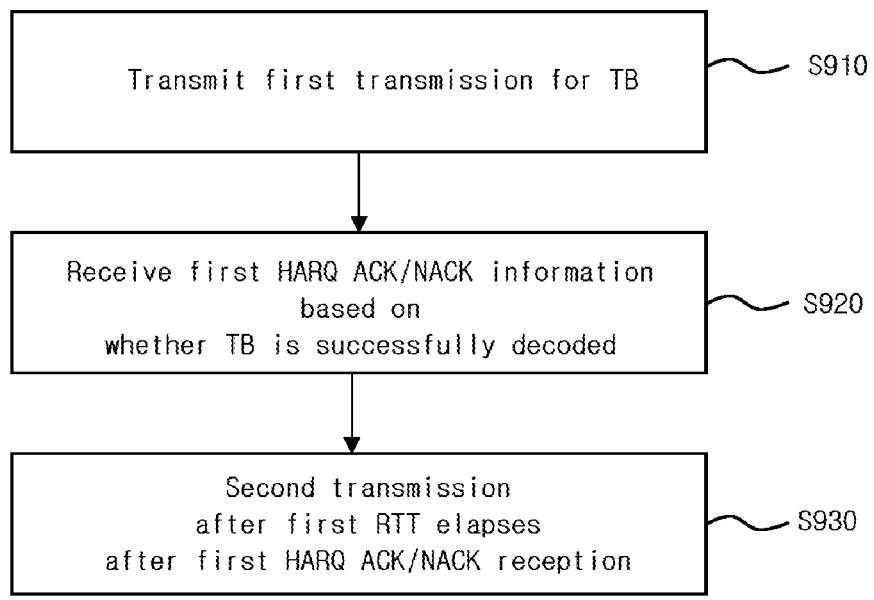
FIG. 9 is a diagram for describing a HARQ-based transmission and reception operation of a base station for group common transmission according to an example of the present disclosure.

FIG. 9 is a diagram for describing a HARQ-based transmission and reception operation of a base station for group common transmission according to an example of the present disclosure.

In the following examples, when a base station transmits group common transmission, it may include transmitting a DCI format which is CRC-scrambled by a group common identifier (e.g., a G-RNTI) through a PDCCH on a search space monitored by corresponding terminal (s) and transmitting a PDSCH scheduled by downlink assignment included in a corresponding DCI format. Group common transmission may include multicast or broadcast of group common data (or a TB). In the following examples, when a base station transmits terminal-specific transmission, it may include transmitting a DCI format which is CRC-scrambled by a terminal-specific identifier (e.g., a C-RNTI) through a PDCCH on a search space monitored by a corresponding terminal and transmitting a PDSCH scheduled by downlink assignment included in a corresponding DCI format. Terminal-specific transmission may include unicast of group common data (or a TB) or unicast of terminal-specific data (or a TB).

In S910, a base station may transmit first transmission of a TB to at least one terminal.

First transmission may be group common transmission or terminal-specific transmission.

In S920, a base station may receive first HARQ ACK/NACK information indicating whether a TB in S910 is successfully decoded from a terminal (i.e., any one of at least one terminal in S910).

HARQ ACK information may indicate that TB decoding succeeds and HARQ NACK information may indicate that TB decoding does not succeed (i.e., fails).

In S930, a base station may perform second transmission after a first RTT elapses after first HARQ ACK/NACK information reception. Second transmission may be transmitted to a terminal in S920 or at least one terminal including a corresponding terminal.

Second transmission may not be expected by a terminal during a first RTT after first HARQ ACK/NACK information transmission and a base station may not perform second transmission during a corresponding time interval.

Second transmission may be group common transmission or terminal-specific transmission.

According to whether second transmission is retransmission of a TB of first transmission or initial transmission of a new TB, a base station may determine at least one of a cast type, a HPN, or a NDI of second transmission based on at least one of a cast type, a HPN, or a NDI of first transmission.

Additionally, third transmission may be performed by a base station after a second RTT elapses after second HARQ ACK/NACK transmission for second transmission. Here, a terminal may not expect third transmission during a second RTT after second HARQ ACK/NACK transmission and a base station may not perform third transmission during a corresponding time interval. Third transmission may be group common transmission or terminal-specific transmission.

According to whether third transmission is retransmission of a TB of second transmission or initial transmission of a new TB, a base station may determine at least one of a cast type, a HPN, or a NDI of third transmission based on at least one of a cast type, a HPN, or a NDI of second transmission.

In an example of FIG. 8 and FIG. 9, a case is assumed in which a HPN (or a HARQ process identifier) of first transmission and second transmission is identical. When first transmission is group common transmission, second transmission is terminal-specific transmission and a NDI is not toggled, it may correspond to a case in which second transmission is retransmission of a TB. When first transmission is group common transmission, second transmission is terminal-specific transmission and a NDI is toggled, it may correspond to a case in which second transmission is initial transmission of a new TB. When first transmission is group common transmission, second transmission is group common transmission and a NDI is not toggled, it may correspond to a case in which second transmission is retransmission of a TB. When first transmission is group common transmission, second transmission is group common transmission and a NDI is toggled, it may correspond to a case in which second transmission is initial transmission of a new TB. When first transmission is terminal-specific transmission, second transmission is terminal-specific transmission and a NDI is not toggled, it may correspond to a case in which second transmission is retransmission of a TB. When first transmission is terminal-specific transmission, second transmission is terminal-specific transmission and a NDI is toggled, it may correspond to a case in which second transmission is initial transmission of a new TB. When first transmission is terminal-specific transmission and second transmission is group common transmission, a NDI may be toggled and second transmission may correspond to initial transmission of a new TB.

In an example of FIG. 8 and FIG. 9, a case is assumed in which a HPN (or a HARQ process identifier) of second transmission and third transmission is identical. When second transmission is group common transmission, third transmission is terminal-specific transmission and a NDI is not toggled, it may correspond to a case in which third transmission is retransmission of a TB. When second transmission is group common transmission, third transmission is terminal-specific transmission and a NDI is toggled, it may correspond to a case in which third transmission is initial transmission of a new TB. When second transmission is group common transmission, third transmission is group common transmission and a NDI is not toggled, it may correspond to a case in which third transmission is retransmission of a TB. When second transmission is group common transmission, third transmission is group common transmission and a NDI is toggled, it may correspond to a case in which third transmission is initial transmission of a new TB. When second transmission is terminal-specific transmission, third transmission is terminal-specific transmission and a NDI is not toggled, it may correspond to a case in which third transmission is retransmission of a TB. When second transmission is terminal-specific transmission, third transmission is terminal-specific transmission and a NDI is toggled, it may correspond to a case in which third transmission is initial transmission of a new TB. When second transmission is terminal-specific transmission and third transmission is group common transmission, a NDI may be toggled and third transmission may correspond to initial transmission of a new TB.

According to such examples of the present disclosure, power consumption of a terminal receiving group common transmission may be reduced. Specifically, as uncertainty for a timing when a terminal may receive terminal-specific retransmission of group common transmitted data is resolved, waste of power of a terminal may be prevented. In addition, based on a cast type for previous transmission, whether a HARQ process is identical, a NDI, etc., initial transmission or retransmission may be clearly determined for a HARQ operation of a terminal.

For example, a terminal may receive a group common PDSCH of a TB for a HARQ process identified by a specific HPN. A terminal may store a corresponding TB in a soft buffer of a corresponding HARQ process. For example, a group common PDSCH may correspond to PTM PDSCH transmission.

A base station may schedule terminal-specific PDSCH transmission (i.e., PTP retransmission) of a corresponding TB for retransmission of a corresponding TB to a corresponding terminal.

In receiving PTP retransmission having the HPN and a non-toggled NDI, a terminal may expect PTP retransmission of a corresponding TB after transmitting NACK for a corresponding TB. Whether to additionally receive retransmission of the same TB on a group common PDSCH having the same HPN and a non-toggled NDI may be determined in a terminal. When PTP retransmission is expected after transmitting NACK for a corresponding TB, a terminal may de-prioritize a group common PDSCH scheduled by group common DCI having the same HPN and a non-toggled NDI. For example, when a terminal may not receive both a de-prioritized group common PDSCH and other transmission, a terminal may drop reception of a group common PDSCH and receive the other transmission.

When the same HPN is shared between PTM transmission, PTP transmission and unicast PDSCH transmission, a base station may support at least one of the following transmission cases:

Following previous PTM PDSCH transmission associated with a specific HPN, a unicast PDSCH scheduled by DCI associated with the same HPN and having a toggled NDI;

Following previous unicast PDSCH transmission associated with a specific HPN, a PTM PDSCH scheduled by DCI associated with the same HPN and having a toggled NDI;

Following previous PTP PDSCH transmission associated with a specific HPN, a unicast PDSCH scheduled by DCI associated with the same HPN and having a toggled NDI;

Following previous unicast PDSCH transmission associated with a specific HPN, a PTP PDSCH scheduled by DCI associated with the same HPN and having a toggled NDI;

Following previous PTM PDSCH transmission associated with a specific HPN, a PTP PDSCH scheduled by DCI associated with the same HPN and having a toggled NDI;

Following previous PTP PDSCH transmission associated with a specific HPN, a PTM PDSCH scheduled by DCI associated with the same HPN and having a toggled NDI.

A terminal detecting one of the transmission cases may perform one of the following operation options according to a priority:

According to operation option 1, for a soft buffer of a HARQ process identified by a corresponding HPN, a terminal may flush an old TB of previous transmission and store a new TB of transmission of a toggled NDI. In addition, a terminal may ignore any retransmission of an old TB after storing a new TB.

According to operation option 2, a terminal may ignore transmission of a toggled NDI. For example, a terminal may ignore transmission of a toggled NDI until an old TB is successfully received. For example, for example, a terminal may ignore transmission of a toggled NDI until HARQ-ACK HARQ-ACK information for an old TB (i.e., HARQ-ACK collectively refers to HARQ feedback information including ACK or NACK) is transmitted. For example, a terminal may ignore transmission of toggled DCI until an old TB is transmitted until the maximum number of retransmissions or until a packet delay budget (PDB) of an old TB. Here, the maximum number of retransmissions of a TB or a PDB may be indicated by a RRC message or may be indicated by DCI scheduling a corresponding TB. For example, until an old TB is transmitted up to a last slot of an old TB, transmission of toggled DCI may be ignored. A last slot of an old TB may be indicated by a RRC message or may be indicated by DCI scheduling a corresponding TB.

According to operation option 3, when transmission corresponding to a toggled NDI corresponds to a high priority (HP), a terminal may apply operation option 1. When transmission corresponding to a toggled NDI has a higher priority than previous transmission, a terminal may apply operation option 1. When transmission corresponding to a toggled NDI corresponds to a low priority (LP) or when previous transmission corresponds to a HP, a terminal may apply operation option 2. When transmission corresponding to a toggled NDI has a lower priority than previous transmission, a terminal may apply operation option 2.

A base station may distinguish between PTP PDSCH transmission and unicast PDSCH transmission based on at least one of a search space/a control resource set (CORESET), a different C-RNTI value, or a specific value/field of DCI having a C-RNTI.

For group common DCI which is CRC-scrambled by a G-RNTI, a terminal may not expect retransmission of a TB or a new TB by group common DCI (regardless of PUCCH ACK/NACK transmission) before the end of PDSCH repetition. For example, a terminal may not expect TB retransmission by group common DCI within a RTT time after PUCCH ACK/NACK transmission.

In the present disclosure, for a terminal receiving different transmission associated with the same HPN, a standard for determining whether to continuously receive a previous TB or whether to switch into new TB reception according to a specific standard and examples of an operation accordingly are described. Accordingly, a terminal may preferentially receive an important TB.

Hereinafter, specific examples of the present disclosure are described.

Figure 10:
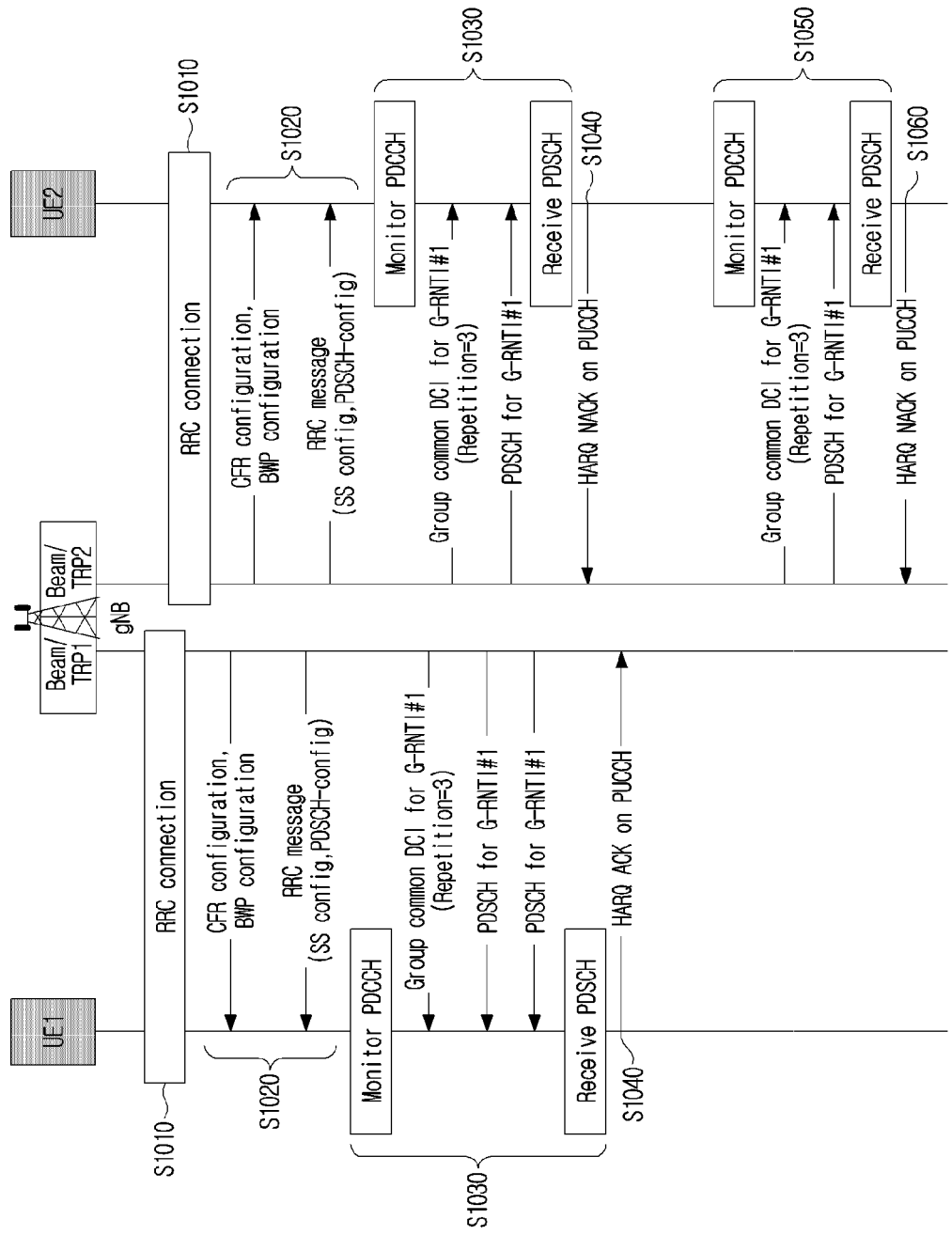
FIG. 10 is a diagram for describing an example of a MBS HARQ-ACK operation according to the present disclosure.

FIG. 10 is a diagram for describing an example of a MBS HARQ-ACK operation according to the present disclosure.

In the present disclosure, MBS HARQ-ACK includes HARQ-ACK for PTM PDSCH based MBS service downlink transmission and/or HARQ-ACK for PTP PDSCH based MBS service downlink transmission.

A base station (gNB)/a cell shown in FIG. 10 may include a plurality of TRPs (TRP1 and TRP2). A TRP may correspond to a specific beam/TCI state/CORESET pool (control resource set pool), etc.

Before an operation of a base station (gNB) and a terminal (UE1 and UE2) shown in FIG. 10, each of terminals may receive a variety of configuration information for MBS data reception from a base station. In addition, each of terminals may be RRC-connected with a base station.

In S1010, each terminal may be RRC-connected with a base station. A RRC connection may include that each terminal receives from a base station a RRC configuration message or a RRC reconfiguration message.

In S1020, each terminal may receive a variety of configuration information from a base station. Configuration information may be provided for each terminal through at least one RRC message. Configuration information may include at least one of system information, terminal-group specific, or terminal-specific information. Configuration information may include a CFR configuration, a BWP configuration, a search space (SS) configuration, a PDSCH configuration, a PUCCH configuration, etc. Some configuration information (e.g., some system information) may be acquired by a terminal even before a RRC connection. Some configuration information may be periodically provided for terminal (s) from a base station without a request of a terminal or may be provided from a base station at a request of a terminal. Configuration information may be included in one message or may be included in a plurality of messages. In addition, configuration information may be provided for terminal (s) through a combination of one or two or more of downlink control information (DCI), a MAC CE, or a RRC message.

For example, a terminal may go into a RRC_CONNECTED mode and report to a base station a message indicating at least one interested MBS service. Such a message may be transmitted from a terminal to a base station through a combination of one or two or more of uplink control information (UCI), a MAC CE, or a RRC message. An interested MBS service in such a message may refer to one of TMGIs or one of G-RNTIs. A list of TMGIs or G-RNTIs may be included in a DL message received from a base station.

For example, a DL message may be a service availability message listing TMGI#1, TMGI#3, TMGI#5 and TMGI#10. When a terminal is interested in TMGI#5, a terminal may indicate order of TMGI#3 in a message. In other words, a terminal may report 3 to a base station.

For example, a DL message may be a service availability message listing G-RNTI#1, G-RNTI#3, G-RNTI#5 and G-RNTI#10. When a terminal is interested in G-RNTI#10, a terminal may indicate order of G-RNTI#10 in a message. In other words, a terminal may report 4 to a base station.

A base station may provide terminal (s) with a CFR configuration, at least one group common PDSCH configuration, a SS configuration, etc. For example, a base station may provide a CFR configuration, at least one group common PDSCH configuration, or a SS configuration, etc. commonly applied to UE1 and UE2 through a common message. Alternatively, a base station may provide a CFR configuration, a group common PDSCH configuration, or a SS configuration, etc. applied to each of UE1 and UE2 through an individual message.

For example, a base station which received a MBS-related message from a terminal may provide a CFR configuration to a terminal through a RRC message. In addition, a base station which received a MBS-related message from a terminal may provide to a terminal through a RRC message at least one group common PDSCH configuration including a TCI state for at least one G-RNTI value. In addition, a base station which received a MBS-related message from a terminal may provide to a terminal through a RRC message a search space configuration including a TCI state for at least one G-RNTI value. A terminal which received such RRC message (s) may operate based on at least one group common SPS configuration.

For example, a RRC message may be a group common message transmitted in a PTM MCCH or a terminal-dedicated message transmitted in a terminal-specific DCCH (dedicated control channel).

For example, a terminal may be configured with a G-RNTI for each MBS, for each CFR, or for each serving cell. For activation, retransmission, or release of at least one group common SPS configuration, a GC-CS-RNTI (group common-configured scheduling-RNTI) may be configured and used.

When a terminal is not configured with a GC-CS-RNTI for a CFR or a serving cell, when a terminal is configured with a CS-RNTI for a CFR or a serving cell, a terminal may use a CS-RNTI for activation, retransmission, or release of at least one group common SPS configuration.

A base station may associate a list of TMGIs or a list of G-RNTIs with one GC-CS-RNTI value. In this case, a base station may provide a list of TMGIs or a list of G-RNTIs associated with a specific GC-CS-RNTI value.

Each PDSCH configuration (e.g., PDSCH-Config) may include at least one of the following information elements for a MBS.

TABLE 6

```
PDSCH-Config ::= SEQUENCE {
dataScramblingIdentityPDSCH INTEGER (0..1023) OPTIONAL, -- Need S
dmrs-DownlinkForPDSCH-MappingTypeA SetupRelease {
DMRS-DownlinkConfig } OPTIONAL, -- Need M
dmrs-DownlinkForPDSCH-MappingTypeB SetupRelease {
DMRS-DownlinkConfig } OPTIONAL, -- Need M
tci-StatesToAddModList SEQUENCE (SIZE(1..maxNrofTCI-States)) OF
TCI-State OPTIONAL, -- Need N
tci-StatesToReleaseList SEQUENCE (SIZE(1..maxNrofTCI-States)) OF
TCI- StateId OPTIONAL, -- Need N
vrb-ToPRB-Interleaver ENUMERATED {n2, n4} OPTIONAL, -- Need S
resourceAllocation ENUMERATED { resourceAllocationType0,
resourceAllocationType1, dynamicSwitch},
pdsch-TimeDomainAllocationList SetupRelease { PDSCH-
TimeDomainResourceAllocationList } OPTIONAL, -- Need M
pdsch-AggregationFactor ENUMERATED { n2, n4, n8 } OPTIONAL, --
Need S
rateMatchPatternToAddModList SEQUENCE (SIZE
(1..maxNrofRateMatchPatterns)) OF RateMatchPattern OPTIONAL, --
Need N
rateMatchPatternToReleaseList SEQUENCE (SIZE
(1..maxNrofRateMatchPatterns)) OF RateMatchPatternId OPTIONAL, --
Need N
rateMatchPatternGroup1 RateMatchPatternGroup OPTIONAL, -- Need R
rateMatchPatternGroup2 RateMatchPatternGroup OPTIONAL, -- Need R
rbg-Size ENUMERATED {config1, config2},
mcs-Table ENUMERATED {qam256, qam64LowSE} OPTIONAL, --
```

TABLE 6-continued

```
Need S
maxNrofCodewordsScheduledByDCI ENUMERATED {n1, n2}
...
}
```

As in an example of Table 6, a PDSCH configuration for a MBS associated with a group common identifier may include at least one of data scrambling identification information (e.g., dataScramblingIdentityPDSCH), time domain allocation information (e.g., pdsch-TimeDomainAllocationList), aggregation factor information (e.g., pdsch-AggregationFactor), rate matching pattern information (e.g., rateMatchPatternToAddModList), modulation and coding scheme (MCS) information (e.g., mcs-Table), or demodulation reference signal (DMRS) related information (e.g., DMRS-DownlinkConfig).

When a specific CFR is confined to at least one (i.e., a plurality of) BWP having the same numerology, a corresponding CFR may be associated with corresponding at least one BWP. In this case, a CFR configuration or a BWP configuration may follow the following example.

For example, a CFR configuration may include at least one BWP identifier associated with a corresponding CFR. For example, when a CFR is associated with 2 terminal-dedicated BWPs, BWP IDs of corresponding 2 terminal-dedicated BWPs may be included in a CFR configuration.

For example, each BWP configuration may include a CFR identifier of a CFR associated with it. For example, when a CFR is associated with 2 terminal-dedicated BWPs, each configuration of 2 BWPs may include a CFR identifier of a CFR associated with it.

For example, BWP identifier(s) of other BWP(s) associated with a corresponding CFR may be included in a BWP configuration of one BWP associated with a CFR. For example, when a CFR is associated with 2 terminal-dedicated BWPs, a configuration for BWP#1 may include a BWP ID of BWP#2.

For BWP switching between terminal-dedicated BWPs associated with the same CFR, a terminal may continue to receive PTP PDSCH (re)transmission and/or PTM PDSCH (re)transmission of a specific TB without changing a CFR during/after BWP switching (i.e., maintaining a CFR configuration).

For BWP switching between BWPs associated with the same CFR, a terminal may maintain at least one of a PDCCH configuration (e.g., PDCCH-Config), a PDSCH configuration (e.g., PDSCH-Config), a SPS configuration (e.g., SPS-Config), or a PUCCH configuration (e.g., PUCCH-Config) for a corresponding CFR.

When a group common PDSCH is received before BWP switching, a terminal may transmit HARQ-ACK information on a corresponding PDSCH on a PUCCH resource after BWP switching. A PUCCH resource may be allocated to a slot after BWP switching. When a PUCCH resource is allocated to a slot during BWP switching, a terminal may drop or defer HARQ-ACK.

When a group common SPS of a SPS configuration is activated before BWP switching, a terminal may consider that a corresponding SPS configuration is still activated even after BWP switching. When a group common SPS PDSCH of a SPS configuration is received before BWP switching, a terminal may monitor SPS retransmission scheduled by DCI which is CRC-scrambled by a G-CS-RNTI for a corresponding SPS configuration.

When a semi-static PUCCH resource is configured on a CFR, a terminal may maintain a semi-static PUCCH resource after BWP switching.

For BWP switching between terminal-dedicated BWPs which are not associated with the same CFR, a terminal may release a configuration for a previous CFR and apply a configuration for a new CFR.

For BWP switching between BWPs which are not associated with the same CFR, a terminal may release at least one of a PDCCH configuration (e.g., PDCCH-Config), a PDSCH configuration (e.g., PDSCH-Config), a SPS configuration (e.g., SPS-Config), or a PUCCH configuration (e.g., PUCCH-Config) for a previous CFR and apply at least one of a PDCCH configuration (e.g., PDCCH-Config), a PDSCH configuration (e.g., PDSCH-Config), a SPS configuration (e.g., SPS-Config), or a PUCCH configuration (e.g., PUCCH-Config) for a new CFR.

For the above-described examples, in order to transmit to a base station HARQ-ACK information indicating whether a terminal successfully decodes MBS transmission from a base station (i.e., HARQ-ACK collectively refers to HARQ feedback information including ACK or NACK), a base station may pre-provide a PUCCH configuration to a terminal. When a terminal receives a MBS service, a base station may pre-configure to a terminal a separate PUCCH configuration for MBS HARQ-ACK (i.e., a PUCCH configuration for multicast) which is distinguished from a PUCCH configuration for unicast.

In S1030, each terminal may perform an operation of PDCCH monitoring and DCI reception based on a specific RNTI and PDSCH reception based on scheduling information included in DCI.

When a search space (SS) for a configured CFR is configured for a terminal, a terminal may monitor a PDCCH to receive CRC-scrambled DCI as a group common identifier (e.g., a G-RNTI or a G-CS-RNTI) on a SS configured in a configured CFR.

When a data unit is available in a MTCH of a MRB (MBS radio bearer) for a MBS service, a base station may construct a TB including a corresponding data unit to transmit it during a specific SPS PDSCH occasion. A specific SPS PDSCH, according to service-to-resource mapping, may be associated with a MTCH of a MRB for a corresponding MBS service, may be associated with a TGMI of a corresponding MBS service, may be associated with a short ID of a corresponding MBS service, or may be associated with a G-RNTI mapped to a corresponding MBS service.

For group common dynamic scheduling of a TB, a base station may transmit DCI to a terminal through a PDCCH and a CRC of corresponding DCI may be scrambled with G-RNTI, G-CS-RNTI or CS-RNTI. A PDCCH may be a group common PDCCH or a terminal-specific PDCCH. Corresponding DCI may include at least one of the following fields:

Identifier Field of DCI Format: This format may indicate one of a MBS-specific DCI format or the existing DCI format for a MBS.

Carrier Identifier Field: This field may indicate a serving cell of a BWP associated with a CFR that a group common PDCCH/PDSCH is transmitted or a cell of a CFR (a serving cell or a MBS specific cell).

BWP Indicator Field: This field may indicate a BWP ID of a BWP associated with a CFR that a group common PDCCH/PDSCH is transmitted or a BWP ID allocated to a CFR.

A frequency domain resource allocation field; a time domain resource allocation field; a VRB-to-PRB mapping field; a PRB bundling size indicator field; a rate matching indicator field; a ZP (zero power) CSI-RS trigger field; a MCS field, a NDI field; a RV (redundancy version) field; a HARQ process number (HPN) field; a downlink allocation index (DAI) field; a transmission power control (TPC) command field for a PUCCH to be scheduled; a PUCCH resource indicator field; a PDSCH-to-HARQ feedback timing indicator field; an antenna port (s) field; a transmission configuration indication (TCI) field; a SRS request field; a DMRS sequence initialization field; a priority indicator field, etc.

For group common dynamic scheduling, a base station may provide the following service-to-resource mapping information through a group common or terminal-specific RRC message or a group common or terminal-specific MAC CE. Service-to-resource mapping information may be provided for a MBS service identified by a TMGI, a G-RNTI, or a GC-CS-RNTI. Data of a MBS service may be transmitted on a MRB of a multicast traffic logical channel (i.e., a MTCH) associated with a MBS service. A RRC message may be a group common message transmitted in a PTM MCCH or may be a terminal-dedicated message transmitted in a terminal-specific DCCH. DCI scheduling a PDSCH carrying MBS service data may indicate at least one of a short ID, a MTCH ID, a MRB ID, a G-RNTI value or a TMGI value for a corresponding MBS service.

When a terminal receives DCI which is CRC-scrambled by an interested G-RNTI, a terminal, based on a predetermined mapping relation, may determine MBS service (s) associated with a predetermined identifier for each PDSCH occasion. A predetermined mapping relation may include at least one of mapping between MBS services and HPNs indicated by DCI, or if available, mapping between MBS services and short ID (s) indicated by DCI. A predetermined identifier may be at least one of a short ID, a MTCH ID, a MRB ID, a G-RNTI value or a TMGI value.

When a terminal is interested in determined MBS service (s), a terminal may receive PDSCH transmission scheduled by corresponding DCI. When a terminal is not interested in determined MBS service (s), a terminal may not receive PDSCH transmission scheduled by corresponding DCI.

In S1040, according to a decoding state for PDSCH transmission, a terminal may transmit a HARQ feedback to a base station.

For example, when receiving group common DCI indicating PUCCH resource (s) for MBS HARQ-ACK, a terminal may transmit HARQ-ACK through a PUCCH after receiving a PDSCH scheduled by corresponding DCI.

In addition, a base station may provide a multicast SPS by configuring a terminal common SPS. For a group common SPS PDSCH (i.e., scheduled by RRC, not by DCI), a group common PUCCH resource used as NACK-only based HARQ-ACK (i.e., ACK is not fedback and only NACK is fedback) may be configured semi-statically for at least one group common SPS configuration. Alternatively, a terminal-specific PUCCH resource used as ACK/NACK-based HARQ-ACK (i.e., ACK or NACK is fed back) may be configured for at least one group common SPS configuration. Alternatively, a group common PUCCH resource for ACK and a group common PUCCH resource for NACK may be separately configured for at least one group common SPS configuration.

For different SPS configurations, the same PUCCH resource or a different PUCCH resource may be configured.

When the same PUCCH resource is allocated to different SPS PDSCHs of a different SPS configuration, one HARQ- ACK bit may indicate ACK or NACK for all SPS PDSCHs. In this case, when all SPS PSCHs are successfully received/decoded, a terminal may indicate ACK. In addition, when at least one SPS PDSCH is not successfully received/decoded, a terminal may indicate NACK. Alternatively, different HACQ-ACK bits may indicate ACK or NACK of a different SPS PDSCH, respectively.

When a different PUCCH resource is allocated to different SPS PDSCHs of a different SPS configuration, different HACQ-ACK bits may indicate ACK or NACK of a different SPS PDSCH, respectively.

When a PUCCH resource is not explicitly indicated for SPS configuration index N, a terminal may determine that a PUCCH resource for SPS configuration index N−k (or N+k) is also used for SPS configuration index N (k is 1 or other integer). Alternatively, when a PUCCH resource is not explicitly indicated for SPS configuration index N, a terminal may determine that a HARQ-ACK operation is disabled for a SPS PDSCH of corresponding SPS configuration index N.

When PUCCH-config for multicast is configured, a terminal may determine that a PUCCH resource for group common SPS configuration index (s) is determined based on PUCCH-config for multicast and a PUCCH resource for terminal-specific SPS configuration index (s) is determined based on PUCCH-config for unicast.

When PUCCH-config for multicast is not configured, a terminal may determine that a PUCCH resource for group common SPS configuration index (s) is determined based on PUCCH-config for unicast.

Next, for group common SPS retransmission, a PUCCH resource may be allocated by DCI which is CRC-scrambled by a G-CN-RNTI.

When a terminal determines a PUCCH resource, a terminal may consider corresponding group common SPS retransmission as a group common PDSCH scheduled by DCI.

When PUCCH-config for multicast is configured, a terminal may determine that a PUCCH resource for group common SPS retransmission is determined based on PUCCH-config for multicast.

When PUCCH-config for multicast is not configured, a terminal may determine that a PUCCH resource for group common SPS retransmission is determined based on PUCCH-config for unicast. When a terminal determines a PUCCH resource, a terminal may consider corresponding SPS retransmission as a unicast PDSCH (or a group common PDSCH).

For terminal-specific SPS retransmission of a TB which was first transmitted by a group common SPS PDSCH, a PUCCH resource may be allocated by DCI which is CRC-scrambled by a SC-RNTI.

In this case, when a terminal determines a PUCCH resource, a terminal may consider terminal-specific SPS retransmission as a unicast PDSCH. Alternatively, when a terminal determines a PUCCH resource, a terminal may consider that corresponding terminal-specific SPS retransmission is a group common PDSCH scheduled by DCI.

When PUCCH-config for multicast is configured, a terminal may determine that a PUCCH resource for group common SPS retransmission is determined based on PUCCH-config for multicast. Alternatively, although PUCCH-config for multicast is configured, a terminal may determine that a PUCCH resource for group common SPS retransmission is determined based on PUCCH-config for unicast.

When PUCCH-config for multicast is not configured, a terminal may determine that a PUCCH resource for group common SPS retransmission is determined based on PUCCH-config for unicast.

NACK-only based HARQ-ACK may be applied to SPS PDSCH retransmission or a terminal-specific ACK/NACK based HARQ-ACK may be also applied.

As in S1040 for UE2 in an example of FIG. 10, when decoding for a TB at a PDSCH transmission occasion is not successful, a terminal may transmit HARQ NACK to a base station on a PUCCH resource determined as in the above-described examples in a configured UL CFR.

With a corresponding PUCCH resource, a terminal may also transmit HARQ-ACK information for other PDSCH transmission (e.g., a unicast SPS PDSCH, a dynamic unicast PDSCH, PTP retransmission, and/or a dynamic group common PDSCH). In this case, in order to multiplex on a PUCCH HARQ-ACK for a variety of PDSCHs in a (sub) slot (e.g., a SPS PSCH for multicast, a SPS PDSCH for unicast, a multicast PDSCH which is dynamically scheduled, and/or a unicast PDSCH which is dynamically scheduled), a terminal may configure a codebook based on the above-described examples.

In addition, when an aggregation factor (e.g., pdsch-AggregationFactor) is configured for a G-RNTI or the number of repetitions (e.g., repetition number) is indicated by a base station in DCI, a TB scheduled by group common DCI may be repeated. For example, when a configuration is performed, in each symbol allocation among each of consecutive slots corresponding to an aggregation factor or among each of consecutive slots corresponding to the number of repetitions, N-th HARQ transmission of a TB may be transmitted.

For HARQ-ACK for slot-based group common PDSCH repetition of a TB, when an aggregation factor (e.g., pdsch-AggregationFactor) is configured for a G-RNTI or when the number of repetitions (e.g., repetition number) is indicated by a base station in DCI which is CRC-scrambled by a G-RNTI, a base station may allocate PUCCH resources as follows.

For example, multiple PUCCH resources may be allocated by group common DCI scheduling slot-based group common PDSCH repeat transmission.

Alternatively, periodic PUCCH resources may be allocated to a terminal receiving a G-RNTI.

Alternatively, for G-RNTI (s), or for a CFR that group common PDSCH repeat transmission is scheduled, periodic PUCCH resources may be allocated. If ACK/NACK-based HARQ-ACK is configured, different terminals may select a different PUCCH resource.

As in S1040 for UE1 in an example of FIG. 10, when a terminal successfully receives/decodes a TB in HPN#i before the end of slot-based group common PDSCH repeat transmission and a PUCCH resource for HARQ-ACK of a corresponding TB is available before the end of slot-based group common PDSCH repeat transmission, a terminal may transmit ACK on a PUCCH resource before the end of slot-based group common PDSCH repeat transmission.

For example, a terminal may skip ACK transmission on other PUCCH resource after the end of slot-based group common PDSCH repeat transmission. In this case, a terminal may receive other TB in HPN#i.

Alternatively, a terminal may retransmit ACK on other PUCCH resource after the end of slot-based group common PDSCH repeat transmission.

Alternatively, a terminal may de-prioritize ACK transmission on other PUCCH resource after the end of slot-based group common PDSCH repeat transmission.

In another example, a terminal may transmit ACK on a terminal-specific PUCCH resource allocated for a unicast PDSCH.

In another example, a terminal may not transmit ACK on a PUCCH resource before the end of slot-based group common PDSCH repeat transmission. A terminal may perform HARQ-ACK transmission on a PUCCH resource indicated by PUCCH resource indication information (PRI) of DCI scheduling a group common PDSCH after the end of slot-based group common PDSCH repeat transmission.

When a terminal successfully receives a TB (e.g., in N-th HARQ transmission) and monitors HARQ retransmission for a corresponding TB by terminal-specific DCI or group common DCI (e.g., N+k-th HARQ transmission), a terminal may operate as follows.

For example, a terminal may skip ACK transmission on a PUCCH resource allocated by DCI.

Alternatively, a terminal may retransmit ACK on a PUCCH resource allocated by DCI.

Alternatively, a terminal may de-prioritize ACK transmission on a PUCCH resource allocated by DCI.

When a base station receives HARQ NACK for a PDSCH transmitted based on a specific TCI state, a base station may retransmit a PDCCH and a PDSCH based on a corresponding TCI state in a DL CFR configured for retransmission of a corresponding TB. In order to receive retransmission of a corresponding TB, a terminal, based on a corresponding TCI state on a search space configured in a DL CFR, may monitor a group common and/or terminal-specific PDCCH.

A base station may retransmit a TB by a terminal-specific PDCCH only for one terminal in a group. As the remaining terminals in a group successfully received a corresponding TB, retransmission for a corresponding TB may not be received.

When a terminal receives a PDCCH for TB retransmission, a terminal may receive a PDSCH scheduled by DCI of a corresponding PDCCH.

When a terminal successfully decodes a TB on a PDSCH, based on a predetermined mapping relation, a terminal may consider that a decoded TB is associated with a MTCH, a MRB, a TMGI, a G-RNTI, and/or a short ID of a MBS service. A predetermined mapping relation may include mapping between MBS services and HPNs indicated by DCI, and/or if available, mapping between MBS services and short ID (s) indicated by DCI.

PDCCH/PDSCH and HARQ-ACK transmission and reception in S1030 to S1040 may correspond to first transmission (or second transmission) in an example of FIG. 8 and FIG. 9 and HARQ-ACK transmission therefor. PDCCH/PDSCH and HARQ-ACK transmission and reception in S1050 to S1060 may correspond to second transmission (or third transmission) in an example of FIG. 8 and FIG. 9 and HARQ-ACK transmission therefor.

For example, a terminal may receive a group common PDSCH of a TB for a HARQ process identified by a specific HPN. A terminal may store a corresponding TB in a soft buffer of a corresponding HARQ process. For example, a group common PDSCH may correspond to PTM PDSCH transmission.

A base station may schedule terminal-specific PDSCH transmission (i.e., PTP retransmission) of a corresponding TB for retransmission of a corresponding TB to a corresponding terminal.

In receiving PTP retransmission having the HPN and a non-toggled NDI, a terminal may expect PTP retransmission of a corresponding TB after transmitting NACK for a corresponding TB.

For example, whether to additionally receive retransmission of the same TB on a group common PDSCH having the same HPN and a non-toggled NDI may be determined in a terminal. When PTP retransmission is expected after transmitting NACK for a corresponding TB, a terminal may de-prioritize a group common PDSCH scheduled by group common DCI having the same HPN and a non-toggled NDI. For example, when a terminal may not receive both a de-prioritized group common PDSCH and other transmission, a terminal may drop reception of a group common PDSCH and receive the other transmission.

After PTP retransmission associated with a specific HPN, a base station may determine whether to schedule new transmission for a group common PDSCH by transmitting group common DCI associated with the same HPN and including a toggled NDI.

For example, when new transmission has a lower priority than PTP retransmission, a terminal may not receive new transmission of a group common PDSCH before successfully transmitting ACK for PTP retransmission. When new transmission has a higher priority than PTP retransmission, a terminal may receive new transmission of a group common PDSCH even before successfully transmitting ACK for PTP retransmission. Otherwise (for example, when new transmission has the same priority as PTP retransmission), a terminal may not receive new transmission of a group common PDSCH before successfully transmitting ACK for PTP retransmission.

After unicast transmission associated with a specific HPN, a base station may determine whether to schedule new transmission for a group common PDSCH by transmitting group common DCI associated with the same HPN and including a toggled NDI.

For example, when new transmission has a lower priority than unicast transmission, a terminal may not receive new transmission of a group common PDSCH before successfully transmitting ACK for unicast transmission. When new transmission has a higher priority than unicast transmission, a terminal may receive new transmission of a group common PDSCH even before successfully transmitting ACK for unicast transmission. Otherwise (for example, when new transmission has the same priority as unicast transmission), a terminal may not receive new transmission of a group common PDSCH before successfully transmitting ACK for unicast transmission.

After transmitting a group common PDCCH/PDSCH associated with a specific HPN, a base station may determine whether to schedule new transmission for a unicast PDSCH by transmitting terminal-specific DCI associated with the same HPN and including a toggled NDI.

For example, when new transmission has a lower priority than group common transmission, a terminal may not receive new transmission of a unicast PDSCH before successfully transmitting ACK for a group common PDSCH. When new transmission has a higher priority than group common transmission, a terminal may receive new transmission of a unicast PDSCH even before successfully transmitting ACK for a group common PDSCH. Otherwise (for example, when new transmission has the same priority as group common transmission), a terminal may receive new transmission of a unicast PDSCH even before successfully transmitting ACK for a group common PDSCH.

In the above-described examples, a terminal may determine a priority of transmission based on one of the following options.

A priority of transmission may be configured by a RRC message. For example, according to a high priority (HP) or a low priority (LP), according to a priority of the highest logical channel of a transmitted TB, or according to QoS KPI like 5QI of a transmitted TB, a priority of transmission may be configured.

A priority may be indicated by DCI scheduling corresponding transmission. For example, according to a high priority (HP) or a low priority (LP), according to a priority of the highest logical channel of a transmitted TB, or according to QoS KPI like 5QI of a transmitted TB, a priority of transmission may be indicated.

A priority of transmission may be determined according to a priority of HARQ-ACK (e.g., a HP or a LP).

Next, for group common DCI which is CRC-scrambled by a G-RNTI, a terminal may not expect retransmission of a TB or a new TB by group common DCI (regardless of PUCCH ACK/NACK transmission) before the end of PDSCH repetition.

For example, a terminal may expect TB retransmission based on group common DCI and/or terminal-specific DCI having a G-RNTI after transmitting PUCCH NACK. Here, group common DCI may indicate enable or disable of retransmission based on a C-RNTI. A terminal may expect retransmission based on group common DCI after transmission of NACK-only HARQ-ACK information. A terminal may expect retransmission based on terminal-specific DCI after transmission of ACK/NACK-based HARQ-ACK information when being configured by a RRC, a MAC CE or DCI.

As an additional example, a terminal may expect new TB transmission based on group common DCI having a G-RNTI after transmitting PUCCH ACK. A terminal may expect new transmission based on terminal-specific DCI after transmission of ACK/NACK-based HARQ-ACK information when being configured by a RRC, a MAC CE or DCI.

For group common DCI which is CRC-scrambled by a G-RNTI, a terminal may not expect new TB transmission by group common DCI (regardless of PUCCH ACK/NACK transmission) before the maximum number of HARQ retransmissions.

In this case, a base station may determine the maximum number of HARQ retransmissions for a G-RNTI or may indicate the maximum number of HARQ retransmissions through DCI.

For group common DCI which is CRC-scrambled by a G-RNTI, a terminal may not expect new TB transmission by group common DCI within a RTT time after PUCCH ACK/NACK transmission.

For example, a terminal may expect TB retransmission based on group common DCI after a RTT time elapses after PUCCH ACK/NACK transmission.

Alternatively, a terminal may expect TB retransmission based on group common DCI even before PUCCH ACK/NACK transmission. In this case, in detecting retransmission, a terminal may suspend PUCCH ACK/NACK transmission. For example, when retransmission is detected, a terminal may drop HARQ-ACK for previous transmission for a G-RNTI and/or a HPN associated with retransmission.

In receiving a TB on a group common PDSCH scheduled by DCI which is CRC-scrambled by a G-RNTI, a terminal may receive PTP PDSCH retransmission of a corresponding TB scheduled by DCI which is CRC-scrambled by a C-RNTI by monitoring a search space/a CORESET associated with a corresponding G-RNTI.

When TB decoding at a PDSCH transmission occasion is successful, a terminal may transmit HARQ-ACK information to a base station on a PUCCH resource according to the above-described examples in a configured UL CFR.

With a corresponding PUCCH resource, a terminal may also transmit HARQ-ACK information for other PDSCH transmission (e.g., a unicast SPS PDSCH, a dynamic unicast PDSCH, PTP retransmission, and/or a dynamic group common PDSCH). In this case, in order to multiplex on a PUCCH HARQ-ACK for a variety of PDSCHs in a (sub) slot (e.g., a SPS PSCH for multicast, a SPS PDSCH for unicast, a multicast PDSCH which is dynamically scheduled, and/or a unicast PDSCH which is dynamically scheduled), a terminal may configure a codebook based on the above-described examples.

When collision occurs, a terminal may perform monitoring of a multicast PDCCH and reception of a multicast PDSCH as follows.

When a multicast PUCCH is overlapped with unicast DL reception which is configured semi-statically; or when a multicast PUCCH is overlapped with unicast UL transmission which is configured semi-statically; or when a multicast PUCCH is overlapped with sidelink transmission and reception which is configured semi-statically, a terminal may defer HARQ-ACK for MBS SPS HARQ-ACK and transmit HARQ-ACK for MBS HARQ-ACK indicated by a PRI of DCI.

When a multicast PUCCH is overlapped with unicast DL reception which is configured dynamically; or when a multicast PUCCH is overlapped with unicast UL transmission which is configured dynamically, a terminal may defer or drop HARQ-ACK (e.g., corresponding to a case in which HARQ-ACK is a low priority (LP) and other transmission/reception is a high priority (HP)), or a terminal may transmit HARQ-ACK (e.g., corresponding to a case in which HARQ-ACK is a HP and other transmission/reception is a LP).

When a multicast PUCCH is overlapped with a dynamic multicast PDSCH, a terminal may drop HARQ-ACK up to a K1 value (e.g., when multicast is a HP), or a terminal may transmit HARQ-ACK (e.g., when multicast is a LP).

When a multicast PUCCH is overlapped with a multicast SPS PDSCH, a terminal may defer or drop HARQ-ACK.

When a terminal triggers a RACH, a terminal may perform monitoring of a group common PDCCH and reception of a group common PDSCH as follows.

A terminal may monitor a group common PDCCH as follows after triggering a RACH. When a RACH is triggered, a terminal may suspend group common PDCCH monitoring and group common PDSCH reception. A terminal may resume group common PDCCH monitoring/reception after receiving one of MSG1 (e.g., PRACH preamble transmission), MSG2 (e.g., random access response (RAR) reception), MSG3 (e.g., PUSCH transmission based on UL grant of a RAR) and MSG4 (e.g., contention resolution message reception) of a 4-step RACH operation. For a 4-step RACH operation, a terminal may apply a high priority to transmission and reception of MSG1, MSG2, MSG3, and MSG4 compared with reception of a group common PDCCH/PDSCH and HARQ-ACK transmission for a group common PDSCH. A terminal may resume group common PDCCH monitoring/reception after receiving one of MSGA (e.g., PRACH preamble and PUSCH transmission) and MSGB (e.g., a RAR and a contention resolution message) of a 2-step RACH operation. For a 2-step RACH operation, a terminal may apply a high priority to transmission and reception of MSGA and MSGB compared with reception of a group common PDCCH/PDSCH and HARQ-ACK transmission for a group common PDSCH.

A terminal may transmit MSB HARQ-ACK on a PUCCH right after MSG2 or MSGB reception (for a contention free (CF) RACH procedure) or right after first MSG3 transmission (for a contention-based RACH procedure). A terminal may not perform MBS HARQ-ACK transmission without UL synchronization. MSG3 may not be multiplexed with PUCCH ACK/NACK. A terminal may disable HARQ-ACK before MSG3 transmission (for a contention-based RACH procedure) and enable HARQ-ACK after MSG3 transmission. A terminal may disable HARQ-ACK before MSG2/MSGB transmission (for a CF-RACH procedure) and enable HARQ-ACK after MSG2/MSGB transmission.

General Device to which the Present Disclosure may be Applied

Figure 11:
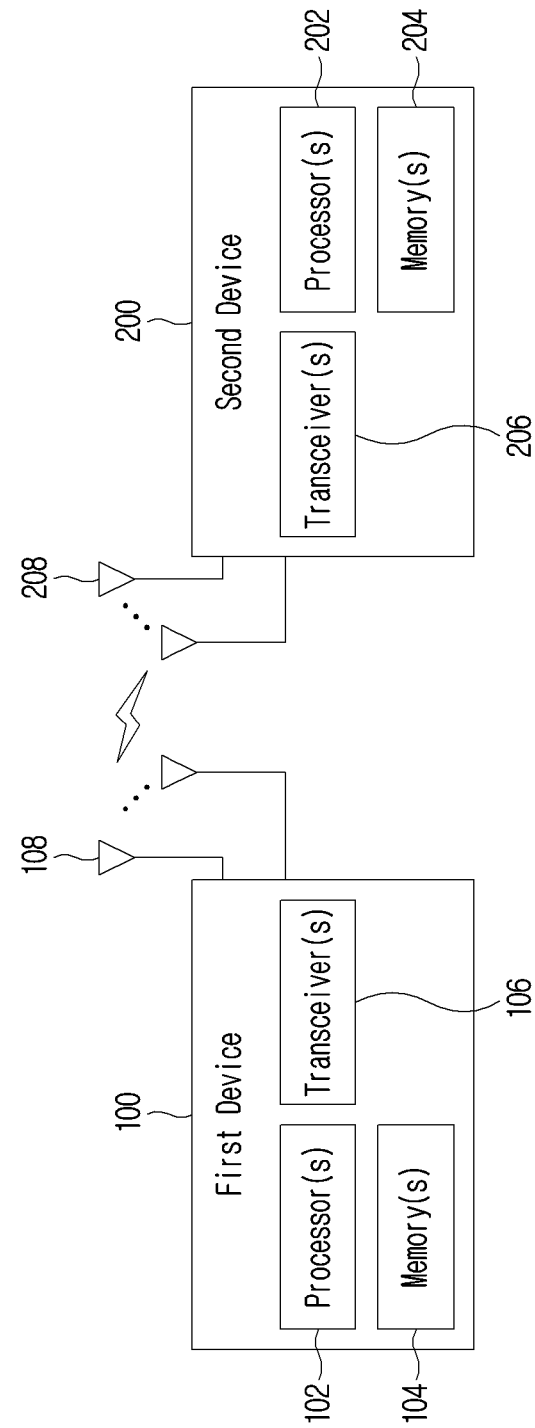
FIG. 11 is a diagram which illustrates a block diagram of a wireless communication system according to an embodiment of the present disclosure.

FIG. 11 is a diagram which illustrates a block diagram of a wireless communication system according to an embodiment of the present disclosure.

In reference to FIG. 11, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/ channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor (s). A memory or alternatively, nonvolatile memory device (s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method performed by a terminal in a wireless communication system, the method comprising:
receiving, from a network, a first transmission for a transport block (TB) based on a group-radio network temporary identifier (G-RNTI);
based on whether the TB is successfully decoded, transmitting, to the network, hybrid automatic repeat request (HARQ) acknowledgement (ACK)/non-acknowledgement (NACK) information for the first transmission;
receiving, from the network, a second transmission based on a Cell(C)-RNTI, wherein a retransmission of the first transmission is expected by the terminal at least after a round trip time (RTT) starting after the transmission of the HARQ ACK/NACK information for the first transmission; and
receiving, from the network, a third transmission based on the G-RNTI,
wherein, based on the first transmission and the second transmission associated with a same HARQ process, and based on a new data indicator (NDI) value not toggled, the second transmission is considered to be a retransmission of the TB of the first transmission, and
wherein, based on the second transmission and the third transmission associated with the same HARQ process, an NDI value is considered to be toggled and the third transmission is considered to be a new transmission.

2. The method according to claim 1, wherein:
based on the first transmission and the second transmission associated with the same HARQ process, and based on the NDI value toggled, the second transmission is considered to be a new transmission.

3. The method according to claim 1, wherein receiving the first transmission or receiving the third transmission comprising:
monitoring a physical downlink control channel (PDCCH) for detecting a downlink control information (DCI) format which is cyclic redundancy check(CRC)-scrambled by the G-RNTI; and
receiving a physical downlink shared channel (PDSCH) scheduled by the DCI format.

4. The method according to claim 1, wherein:
the first transmission or the third transmission corresponds to a multicast transmission.

5. The method according to claim 1, wherein receiving the second transmission comprising:
monitoring a PDCCH for detecting a DCI format which is CRC-scrambled by the C-RNTI(c); and
receiving a PDSCH scheduled by the DCI format.

6. A terminal in a wireless communication system, the terminal comprising:
at least one transceiver; and
at least one processor connected to the at least one transceiver,
wherein the at least one processor is configured to:
receive, through the at least one transceiver, from a network, a first transmission for a transport block (TB) based on a group-radio network temporary identifier (G-RNTI);
based on whether the TB is successfully decoded, transmit, through the at least one transceiver, to the network, hybrid automatic repeat request (HARQ) acknowledgement (ACK)/non-acknowledgement (NACK) information for the first transmission;
receive, through the at least one transceiver, from the network, second transmission based on a Cell(C)-RNTI, wherein a retransmission of the first transmission is expected by the terminal at least after a round trip time (RTT) starting after the transmission of the HARQ ACK/NACK information for the first transmission; and
receive, through the at least one transceiver, from the network, a third transmission based on the G-RNTI,
wherein based on the first transmission and the second transmission associated with a same HARQ process, and based on a new data indicator (NDI) value not toggled, the second transmission is considered to be a retransmission of the TB of the first transmission, and
wherein, based on the second transmission and the third transmission associated with the same HARQ process, an NDI value is considered to be toggled and the third transmission is considered to be a new transmission.

7. A base station in a wireless communication system, the base station comprising:
at least one transceiver; and
at least one processor connected to the at least one transceiver,
wherein the at least one processor is configured to:
transmit, through the at least one transceiver, to at least one terminal, a first transmission for a transport block (TB) based on a group-radio network temporary identifier (G-RNTI);
based on whether the TB is successfully decoded, receive, through the at least one transceiver, from a terminal, hybrid automatic repeat request (HARQ) acknowledgement (ACK)/non-acknowledgement (NACK) information for the first transmission;
transmit, through the at least one transceiver, to the terminal, first transmission based on a Cell(C)-RNTI, at least after a round trip time (RTT) elapses after the reception of the HARQ ACK/NACK information for the first transmission; and
receiving, through the at least one transceiver, to the at least one terminal, a third transmission based on the G-RNTI,
wherein, based on the first transmission and the second transmission associated with a same HARQ process, and based on a new data indicator (NDI) value not toggled, the second transmission is a retransmission of the TB of the first transmission, and
wherein, based on the second transmission and the third transmission associated with the same HARQ process, an NDI value is considered by the terminal to be toggled, and the third transmission is a new transmission.

* * * * *